(12) United States Patent
Cvijanovic et al.

(10) Patent No.: US 6,193,321 B1
(45) Date of Patent: Feb. 27, 2001

(54) FULL FACED STEEL VEHICLE WHEEL AND METHOD OF MANUFACTURE

(75) Inventors: Ratko Cvijanovic; Daryl Siedelmann, both of Henderson, KY (US)

(73) Assignee: Accuride Corporation, Henderson, KY (US)

(*) Notice: Subject to any disclaimer, the term of this patent is extended or adjusted under 35 U.S.C. 154(b) by 0 days.

(21) Appl. No.: 09/510,060

(22) Filed: Feb. 22, 2000

Related U.S. Application Data

(62) Division of application No. 09/189,816, filed on Nov. 10, 1998, now Pat. No. 6,073,347.

(51) Int. Cl.[7] .................................................. B62D 3/14
(52) U.S. Cl. ........................ 301/63.1; 301/95; 29/894.323
(58) Field of Search .................. 29/894.322, 894.323; 301/63.1, 64.1, 64.2, 64.3, 95, 96, 97, 98

(56) References Cited

U.S. PATENT DOCUMENTS

| | | | |
|---|---|---|---|
| 5,257,455 | * 11/1993 | Iwatsuki | 301/63.1 X |
| 5,917,947 | * 7/1999 | Stach et al. | 301/65 |
| 6,030,051 | * 2/2000 | Hosoda et al. | 301/63.1 |

* cited by examiner

*Primary Examiner*—Russell D. Stormer
(74) *Attorney, Agent, or Firm*—Kilgannon & Steidl

(57) ABSTRACT

A full faced vehicle wheel manufactured by stamping a steel disc, embossing a plurality of vent holes in the disc and rolling a partial steel rim. The partial steel rim has an outer beadseat with an outer edge, the outer beadseat at its inner surface rolled at a predetermined angle and to a predetermined inner diameter at its edge. The full faced disc has an outer flange with an inner surface smoothly flowing into a radius which smoothly flows into a circumferential beadseat area extending inwardly at a corresponding matching angle to the aforesaid predetermined angle. The vent holes are embossed to extend the beadseat area inwardly at the same matching angle at the outer periphery of the vent holes, to form inwardly extending, intermittent supporting and guiding areas only at the vent holes. The outer surface edge of each intermittent area has an outer diameter slightly less than the aforesaid predetermined inner diameter of the rim edge. The rim is assembled onto the disc by guiding the inner surface of the rim outer beadseat over the intermittent areas and then over the beadseat area of the disc up to the radius. A weld is applied. The radius centers and provides a 360° fit up of rim and disc.

5 Claims, 4 Drawing Sheets

FULL FACED STEEL VEHICLE WHEEL AND METHOD OF MANUFACTURE

This application is a division of U.S. application Ser. No. 09/189,816, filed Nov. 10, 1998 and now U.S. Pat. No. 6,073,347. Applicant claims the benefit of the prior United States application.

FIELD OF THE INVENTION

The present invention relates to wheels for motor vehicles, and more particularly to disc wheels having a stamped steel disc and a rolled steel rim.

BACKGROUND OF THE INVENTION

It is well known that full faced vehicle wheels with full faced discs are desirable because of the attractive appearance of a continuous disc surface extending from the central portion of the disc out through the disc flange.

Numerous prior methods of manufacture have been carried out to achieve this result, including bimetal wheels where aluminum cast wheels are assembled to rolled steel rims by the use of inserts into the aluminum disc to which the steel rim is welded, and/or by inserting the end of the rim into a groove in the cast aluminum disc. The manufacturing operations of the above are complex and require precise relative dimensioning of parts.

Other full face wheel designs utilize steel discs and steel rims, wherein the rim edge is welded perpendicularly to the inner surface of the disc flange; or the rim edge is downturned to a terminating cylindrical surface which engages small discontinuous flat disc projections; or the disc has an area with one or more bumps or beads into which is rolled the rim outer beadseat; or wherein the disc flange is cut, notched, machined and/or bent over to form a ledge for the rim beadseat to engage. In the first instance, the assembled structure may not be as strong as desired. In the second instance, very precise machining and dimensioning are required and no beadseat area is present on the disc but for the small cylindrical discontinuous disc projections; in the third and fourth instances, more complex manufacturing operations are contemplated.

Examples of prior art relating to the above and other full faced designs include U.S. Pat. Nos. 5,591,386; 5,526,977; 5,634,694; 5,257,455; 5,421,642; 5,435,632; 5,027,508; 5,295,304; 5,188,429; 5,803,553, 5,647,126; 5,538,329; 4,610,482 and 3,506,311.

SUMMARY OF THE INVENTION

The present invention is intended to overcome the deficiencies of the above-noted prior art. A full faced vehicle wheel and method of manufacture is disclosed having a rolled steel partial rim, a stamped steel disc, and a plurality of vent holes embossed in the steel disc. It should be understood that the use of the term vent holes throughout this application is meant to include hand holes, vent holes being used in smaller wheels and hand holes (which also vent) being used in larger wheels. The invention is applicable to both smaller and larger wheels. The steel rim is rolled to provide an inner flange, an inner beadseat, a central section, and an outer beadseat with an outer edge, the outer beadseat at its inner surface being rolled at a predetermined angle and to a predetermined inner diameter at its edge. A full faced steel disc is stamped to have an outer flange with an inner surface extending radially inward and smoothly flowing into a radius at the bottom of the outer flange inner surface which in turn smoothly flows into a supporting circumferential beadseat area extending away from the radius and inwardly at a corresponding matching angle to the predetermined angle of the inner surface of the outer beadseat. The vent holes are embossed into the disc including extending the supporting beadseat area inwardly at the same corresponding matching angle at the outer periphery of each vent hole a distance greater than the circumferential beadseat extends inwardly at positions about the wheel between the vent holes. Inwardly extending intermittent supporting and guiding areas are thereby formed. The edge of the outer surface of each of the intermittent supporting areas is provided with an outer diameter slightly less than the said predetermined inner diameter at the outer edge of the rim. The rim is then assembled to the disc by forcing and guiding the inner surface of the rim outer beadseat first over the outer surface of the intermittent areas at the vent hole outer peripheries, and then over the outer surface of the disc beadseat area a predetermined distance up to or beyond the beginning of the aforesaid radius. If desired, the rim outer beadseat edge can even be curled up into the radius at the bottom of the flange. Since the rolled rim will have a small degree of ovality, the rim outer beadseat is expanded at certain positions about its periphery during the assembly. A weld is then applied between the rim and disc at the rim outer beadseat outer edge.

The disc intermittent areas guide the rim beadseat onto the disc during assembly, with the angled inner surface of the rim outer beadseat first encountering and contacting the angled intermittent areas near the edges of the outer surfaces of the intermittent areas. When assembly is complete, the intermittent areas in addition to the disc beadseat area further provide a large distance of engagement with, and substantial support for, the rim. The radius at the base of the flange centers and ensures a 360° fit up of the rim and disc. Very high engagement tolerances are not required.

Other features and advantages of the present invention will be apparent from the following description, drawings and claims.

DETAILED DESCRIPTION OF EMBODIMENTS

Figure 1:
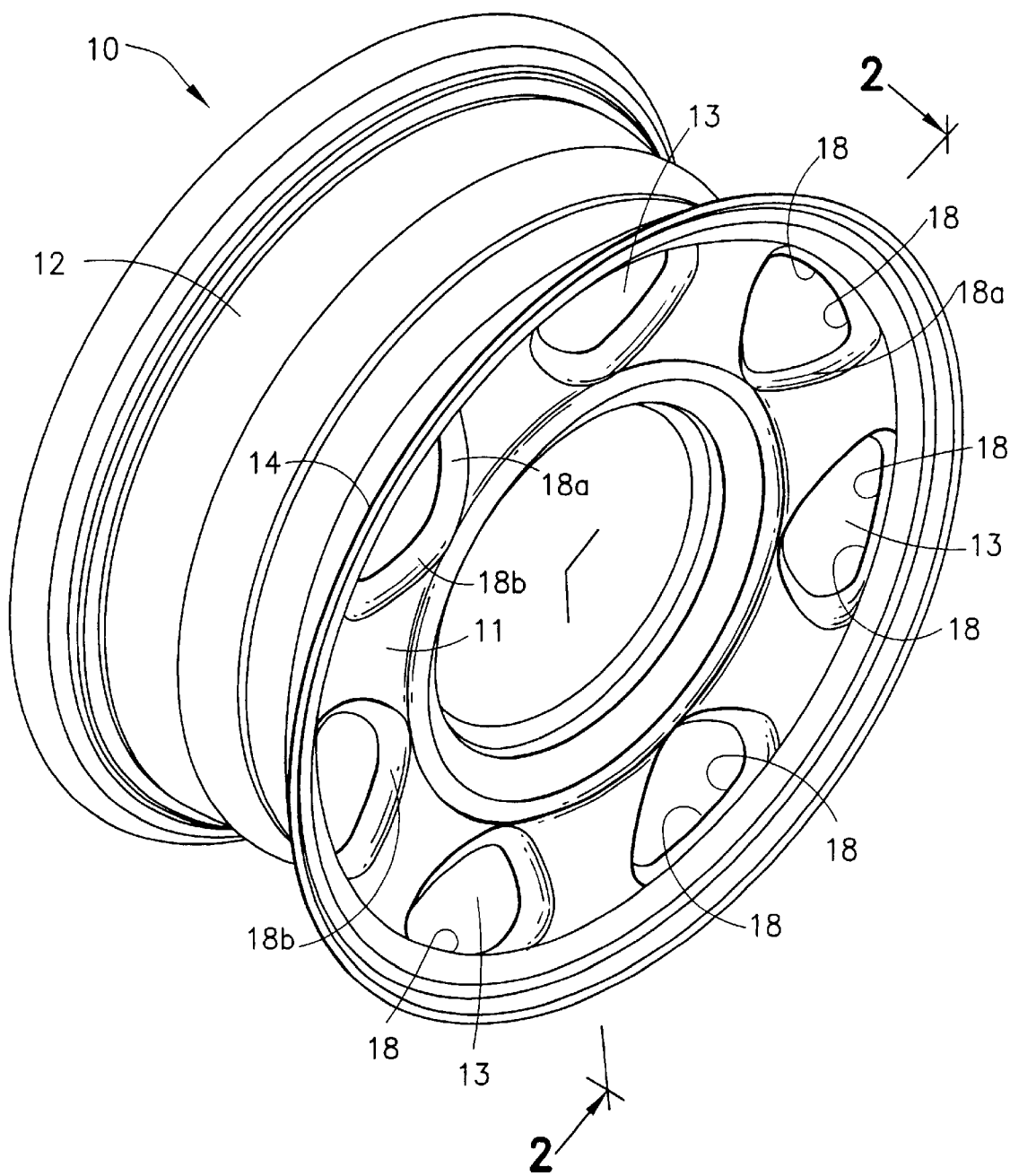
FIG. 1 is a perspective view of the wheel of the present invention, having a full-faced stamped steel disc and a rolled steel rim.
Figure 3:
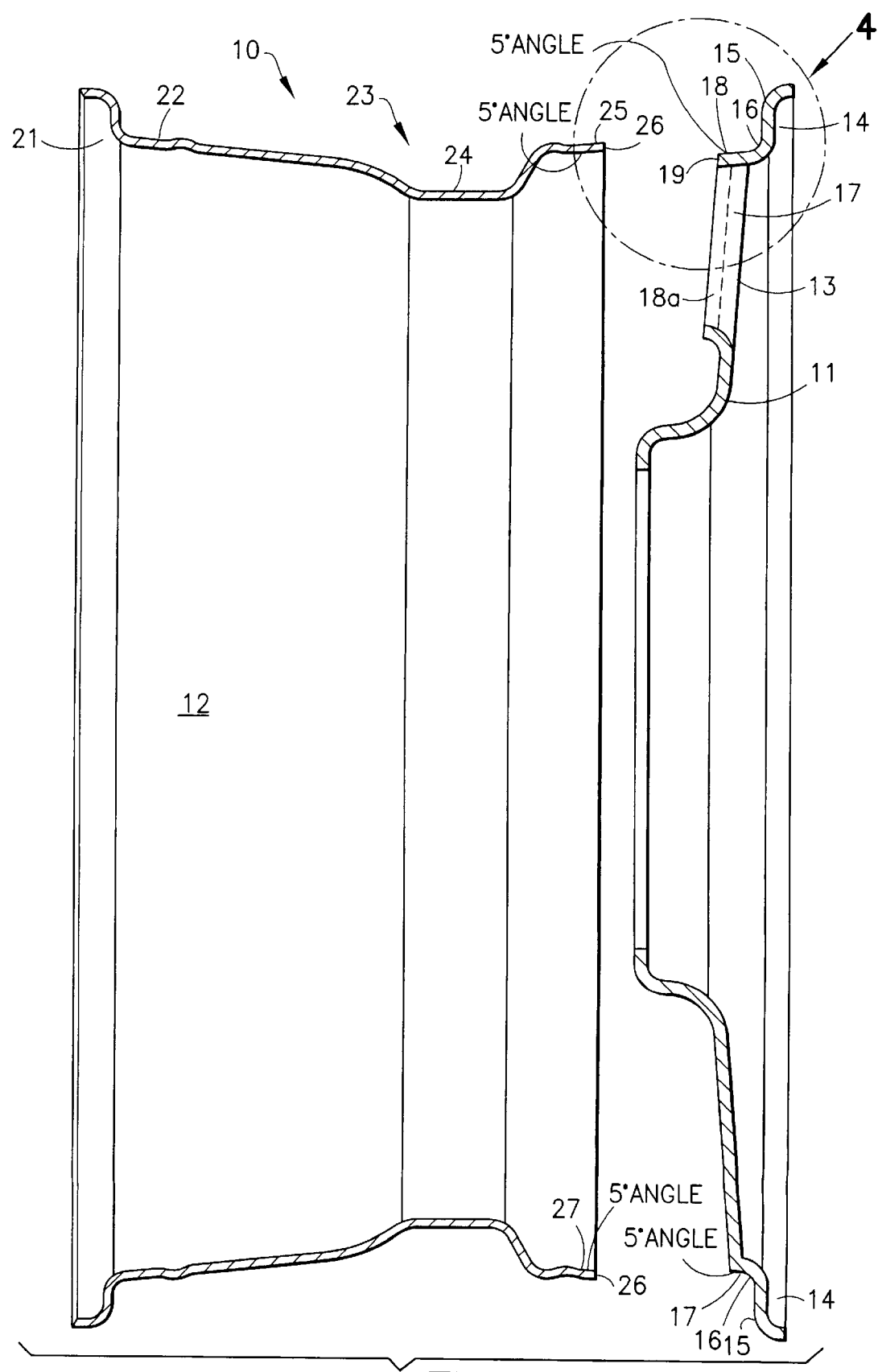
FIG. 3 is a profile view corresponding to FIG. 2 but showing the rolled steel rim and stamped steel disc before assembly to each other.

Referring to FIGS. 1 and 3, full faced steel wheel 10 is shown having a stamped steel disc 11, a rolled steel partial rim 12 and vent holes 13 (seven as shown) embossed into steel disc 11.

Figure 2:
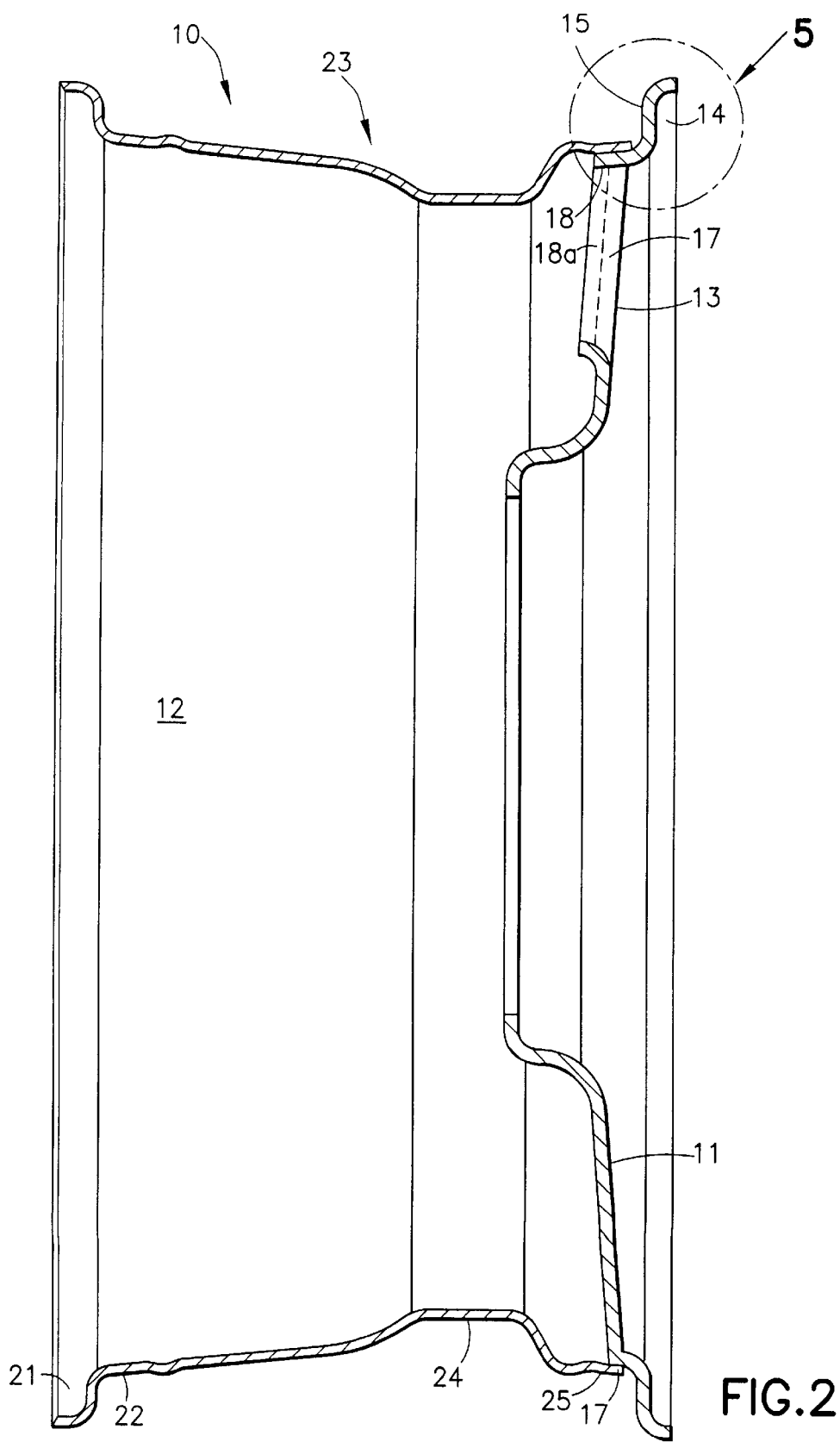
FIG. 2 a cross-sectional profile view of the assembled wheel take along lines 2—2 of FIG. 1.

Steel disc 11 is full faced and formed by the well-known conventional stamping operation wherein a steel blank is formed by a series of progressive stamping operations to the profile shown in FIGS. 1–3. Vent holes 13 are embossed into the stamped steel disc at or near the end of the stamping operation. Only one of the vent holes is shown in FIGS. 2–3 to reduce clutter in the drawing, but it will be understood that the vent holes are identical.

Stamped and embossed steel disc 11 as shown in FIGS. 1–3 has outer flange 14, the inner surface 15 of which extends radially inwardly in an essentially vertical direction. Surface 15 flows smoothly into disc radius 16 which in turn flows smoothly into outer beadseat area 17 which is a continuous surface circumferentially about the disc 11. Outer beadseat area 17 extends inwardly at a 5° angle to the horizontal as shown in FIGS. 2–5.

Outer beadseat area 17 at intermittent positions circumferentially about the disc 11 has intermittent areas 18 formed as continuations of beadseat area 17 and thus also extending further inwardly at the 5° angle to the horizontal as shown in FIGS. 2–5. Intermittent areas 18 are present only at the outer peripheries of the vent holes, and are formed at each vent hole in the stamping and embossing of the vent holes. (The other radially inward raised portions 18a and 18b of the embossed vent holes 13, on the inner surface of disc 11, play no part in the present invention). As previously noted, FIGS. 2–3 are taken along line 2—2 of FIG. 1, so that the top portions of FIGS. 2–3 illustrate an intermittent area 18 at a vent hole 13, whereas the bottom portions of FIGS. 2–3 illustrate the absence of intermittent areas 18 in the circumferential space between the vent holes 13. Disc 11 before embossing of the vent holes initially has the configuration shown at the bottoms of FIGS. 2 and 3. During the embossing, a die outwardly backs up where intermittent areas 18 are to be formed so that the continuous extension at 5° of beadseat area 17 into intermittent areas 18 is formed. The intermittent areas 18 are discussed in greater detail hereafter.

Figure 4:
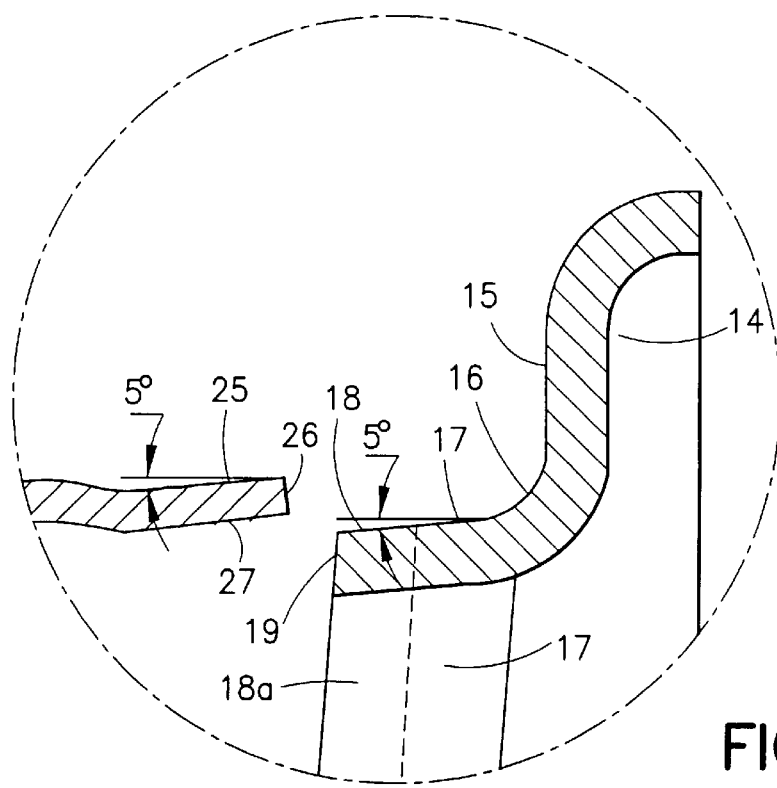
FIG. 4 is an exploded partial view taken from FIG. 3 to illustrate particularly significant aspects of the present invention before assembly.
Figure 5:
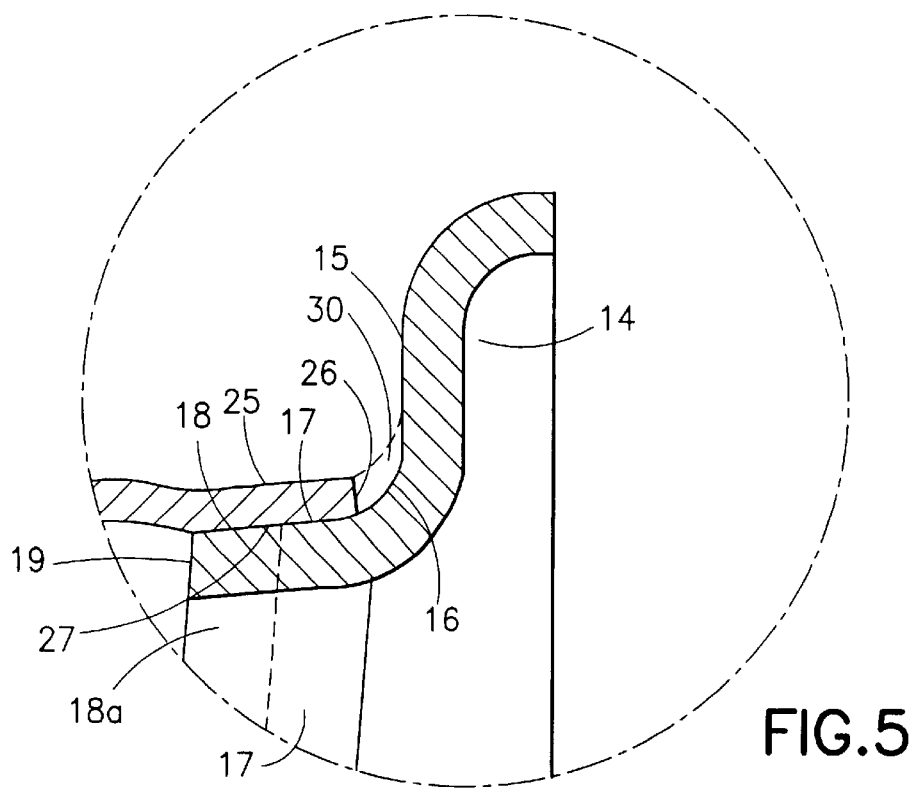
FIG. 5 is an exploded partial view taken from FIG. 2 to illustrate particularly significant aspects of the present invention after assembly.

Rolled steel partial rim 20 as shown in FIGS. 1–3 has inner flange 21, inner beadseat 22, a central section 23 including well 24 and outer beadseat 25 which terminates at edge 26. Rim 20 is rolled to the shape shown in FIG. 3 by the well-known conventional rolling operation for steel rims, wherein strip steel stock is coiled, butt welded and roll formed to the FIG. 3 shape. Outer beadseat 25 is rolled so that its inner surface 27 circumferentially about the rim has a 5° angle to the horizontal extending as shown in FIGS. 3–5. Terminating edge 26 of beadseat 25 is trimmed and machined. The inner diameter of the outer beadseat 25 at edge 26 is only slightly larger than the outer diameter of each intermittent area 18 at edge 19. Outer beadseat 25 is slightly undersize or to size, not oversize, in diameter so as to give a tight disc to rim fit.

When the steel disc 11 with vent holes 13, 5° continuous beadseat area 17 and 5° intermittent areas 18 has been stamped, and the steel partial rim 12 with 5° beadseat 25 has been rolled, disc 11 and rim 12 are then aligned as shown in FIG. 3 and the rim 12 is pressed onto disc 11. At the beginning of the pressing operation, edge 26 of beadseat 25 overlies and is slightly spaced from edges 19 of the intermittent areas 18. As the pressing continues, the diameters of the intermittent areas 18 near edges 19 match and contact the inner diameter of outer beadseat 25 at edge 26. As the rim 12 is further pressed onto disc 11, the 5° angle inner surface 27 of beadseat 25 and the 5° angle outer surfaces of intermittent areas 18 contact each other, and the end of the beadseat 26 is guided by and slides past the intermittent areas 18 and onto the continuous circumferential beadseat area 17 of the disc 11. This condition is shown in FIG. 2. FIGS. 4 and 5 show in exploded view this assembly process at the vent holes. The pressing of the rim 12 onto disc 11 extends to the position shown in FIGS. 2 and 5 to ensure fit up of the rim and disc, with radius 16 serving to center the rim; or, with a longer outer beadseat 25, the rim 12 can be pressed even further onto the disc so that edge 26 of outer beadseat 25 and a small portion of outer beadseat 25 curl up into radius 16 of disc 11. When the pressing together of rim 12 onto disc 11 is complete, a weld 30 is made at edge 26 of beadseat 25, with the weld smoothly flowed into inner surface 15 of the disc flange 14. A wide area is provided for the weld.

The intermittent areas 18, in addition to outer beadseat area 17, provide a large distance of engagement and thus substantial support for the rim beadseat 25. Force accordingly is better transmitted from the rim to the disc over the vent holes, and flexing is reduced at the weld joint. Further, a very high engagement tolerance is not required. Overall, a better and very strong fit of disc and rim is obtained.

It is well known that rolled steel rims generally have an ovality to them after the rolling operation is complete. It is also well known that stamped steel discs have essential circularity to them after the stamping operation is complete. A significant virtue of the present invention is that the ovality of the rolled rim 12 is reformed to essentially circularity when the rim is pressed onto the circular disc 11, with certain circumferential portions of the rim accordingly expanded as necessary and other circumferential portions of the rim accordingly contracted. It is thus assured that the rim beadseat diameter is correct around the wheel to give a 360° rim to disc contact.

It will be appreciated by persons skilled in the art that variations and/or modifications may be made to the invention without departing from the spirit and scope of the invention, the present embodiments therefore being illustrative and not restrictive. Merely as an example, the present invention may be used with 15° wheels if desired. Further, in the present invention, a line-up bevel for the rim may be used at edges 19 of intermittent areas 18. Still further, the vent holes may be replaced by embossed depressions which are not punched all the way through the disc to create vent holes, but in all other respects the embossed depressions being formed and functioning as described above in relation to the vent holes. The term vent holes accordingly is meant to include this variation as well.

As a still further modification, beadseat area 17 may be eliminated with radius 16 flowing smoothly into intermittent areas 18, and with an outwardly curving radius applied to outer beadseat edge 26 prior to assembly so that it will nestle within and up against radius 16 when the rim is assembled to the disc, all other aspects of the invention being as described above.

What is claimed is:

1. A full faced steel wheel having a roll-formed steel rim and a stamped full faced steel disc, said disc having a plurality of embossed vent holes; said steel rim having an inner flange, an inner beadseat, a central section and an outer beadseat having an outer edge, the inner surface of the outer beadseat extending upwardly and outwardly at a predetermined angle to terminate in a predetermined inner diameter at its outer edge; said full faced steel disc having an outer flange with an inner surface extending radially inward, a radius at the bottom of the outer flange inner surface and a supporting circumferential beadseat area extending smoothly away from the radius and inwardly at a corresponding matching angle to the predetermined angle of the inner surface of the outer beadseat; intermittent supporting and guiding areas at the outer peripheries of each vent hole forming inwardly extending continuations of the supporting beadseat area at the same corresponding matching angle, further characterized by a lack of said intermittent areas between the vent holes; the inner surface of said rim outer beadseat overlying and contacting said intermittent areas and said beadseat area of the disc; and, a welded joint between the rim and disc at the outer end of the rim outer beadseat.

2. The invention of claim 1, wherein the predetermined and matching angles are five degrees to the horizontal.

3. The invention of claim 1, wherein the outer edge of the rim outer beadseat is curled up into the radius at the bottom of the outer flange inner surface.

4. A full faced steel wheel having a roll-formed steel rim and a stamped full faced steel disc, said disc having a plurality of embossed vent holes; said steel rim having an inner flange, an inner beadseat, a central section and an outer beadseat having an outer edge, the inner surface of the outer beadseat extending upwardly and outwardly at a predetermined angle to terminate in a predetermined inner diameter adjacent to its outer edge and having a predetermined radius at the outer beadseat outer edge; said full faced steel disc having an outer flange with an inner surface extending radially inward and a radius essentially the same as the predetermined radius at the bottom of the outer flange inner surface; said full faced disc having intermittent supporting and guiding areas at the outer peripheries of each vent hole smoothly extending from the radius at the bottom of the outer flange inner surface and extending inwardly at the same predetermined angle, further characterized by a lack of said intermittent areas between the vent holes; the inner surface of said rim outer beadseat overlying and contacting said intermittent areas of the disc; said radius at the outer beadseat outer edge nestled within and up against the radius at the bottom of the outer flange inner surface; and, a welded joint between the rim and disc at the outer end of the rim outer beadseat.

5. The invention of claim 4, wherein the predetermined and matching angles are five degrees to the horizontal.

* * * * *